Aug. 7, 1945.                M. G. CROSBY                2,380,948
                         ELECTRONIC MOTOR CONTROL
                          Filed March 21, 1942            2 Sheets-Sheet 1
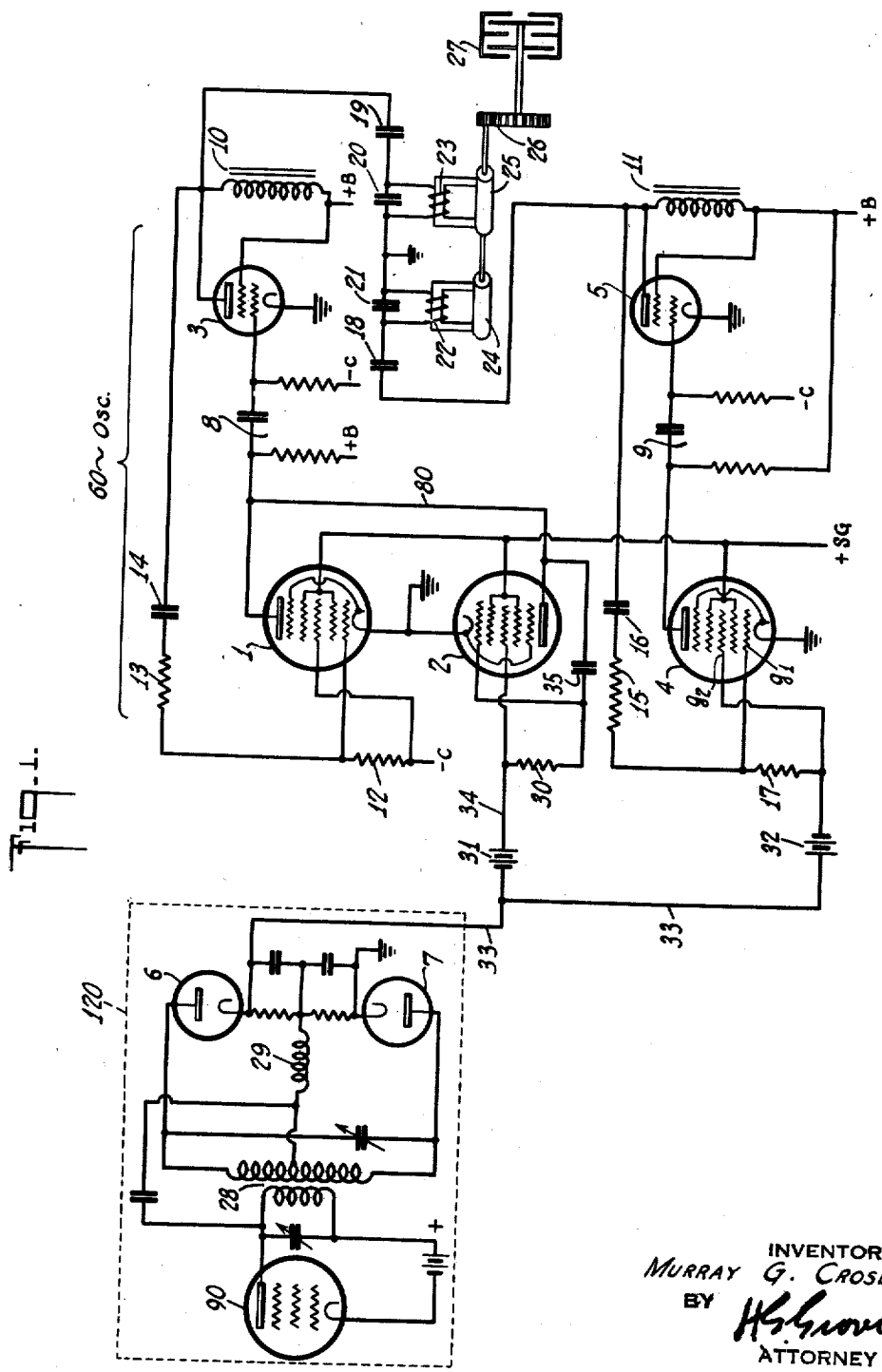
INVENTOR
MURRAY G. CROSBY.
BY
ATTORNEY

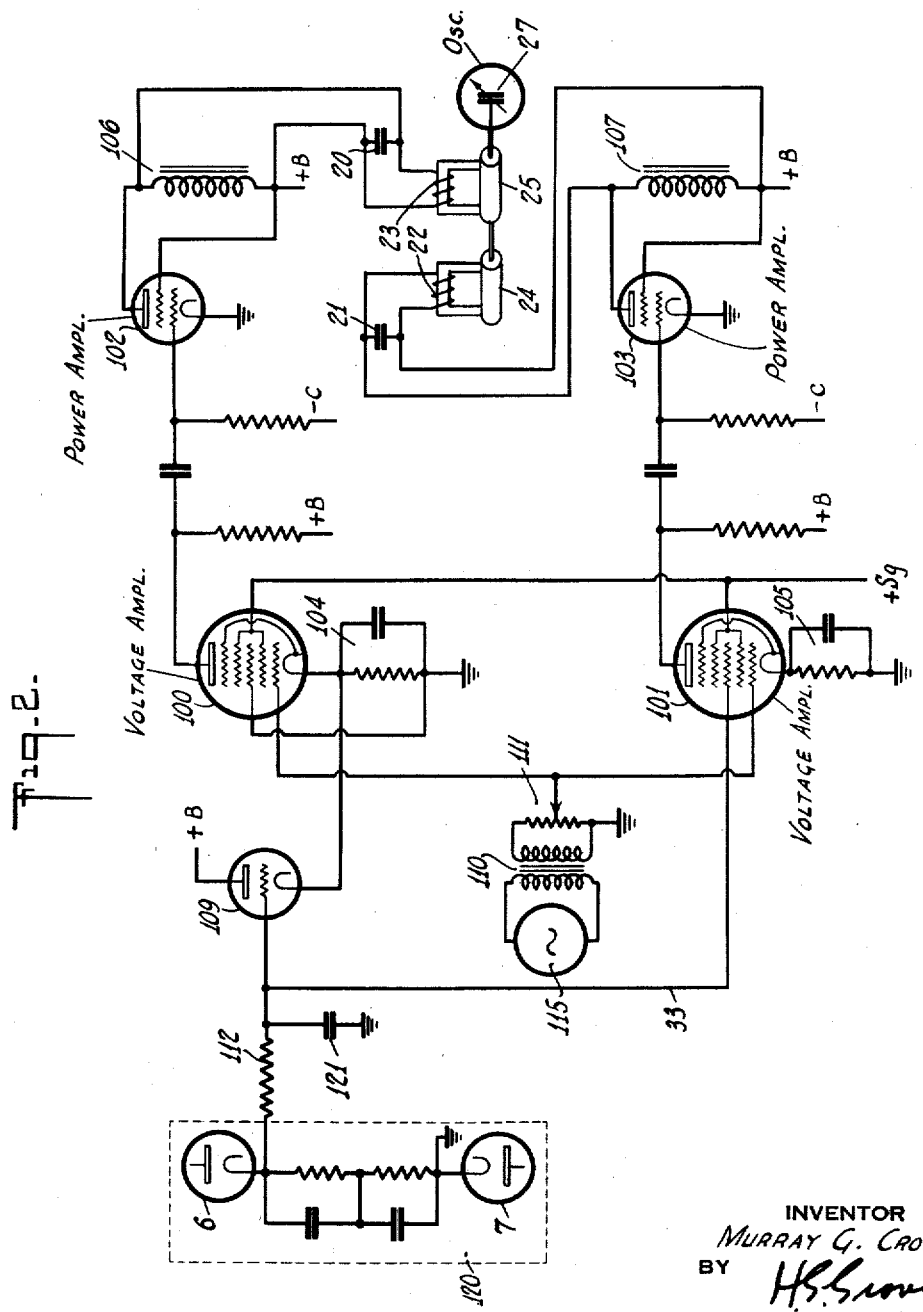

Patented Aug. 7, 1945

2,380,948

UNITED STATES PATENT OFFICE 2,380,948

ELECTRONIC MOTOR CONTROL

Murray G. Crosby, Riverhead, N. Y., assignor to Radio Corporation of America, a corporation of Delaware Application March 21, 1942, Serial No. 435,624

15 Claims. (Cl. 172—274)

This invention relates to a motor control system adapted primarily for use in high frequency electrical systems, such as in radio systems.

Heretofore, in certain types of motor drive used largely in automatic frequency control and remote control tuning systems, it has been customary to employ either a relay system to switch the power to a motor or a magnetic clutch in a manner described, for example, in United States Patent 2,184,958, granted December 26, 1939, to D. R. Goddard. The former of these known systems has the disadvantage of sparking contacts which must be cleaned periodically and which are a source of radio interference. The latter of these systems has disadvantages which reside in the friction drive, and in the fact that either a relay or a rather complicated gaseous type (Thyratron) system must be used to obtain enough energy to operate the magnet.

The present invention provides a motor control system in which contacts are eliminated and a smooth electronic control is obtained which does not draw power from the controlling voltage. Among the objects of the invention are: To provide an electronic system for controlling the rotation of a motor, and which is characterized by the absence of mechanical relays; to simplify and improve the art of electromechanical drives; and to provide an improved system for exercising a fine degree of control over apparatus requiring a rotary motion.

In brief, the present invention employs vacuum tube circuits which may be controlled by a small voltage variation with negligibly small current drain to directly energize the separate windings of a two-winding reversible alternating current motor. This motor mechanism has two separate windings which are energized separately to produce two different directions of rotation, each winding forming part of the anode tuned circuit of a vacuum tube which is tuned to the frequency required by the motor. As an alternative, the motor mechanism may comprise two separate motors coupled to the same shaft but so arranged that they rotate the shaft in opposite directions.

In one embodiment of the present invention, each winding is fed from a separate tube amplifier which is excited by a low frequency alternating voltage of the frequency required by the motor. Such a system permits a variation of the gain of the power amplifiers feeding the motor windings so that the direction of rotation may be changed.

In another embodiment of the invention, the vacuum tubes energizing the motor winding are amplifying circuits which are caused to oscillate, thus eliminating the need of an external source of low frequency alternating voltage. In this last embodiment, the control voltage varies the degree of regeneration of the oscillators to permit the starting of one oscillator and the stopping of the other oscillator to reverse the directions of rotation.

A feature of the invention comprises the oscillator system under control of a changing direct current voltage for applying or removing the power fed to the motor.

Another feature of the invention lies in the use of a motor winding to form an essential part of the tuned circuit of an electron discharge device.

Still another feature is the combination of reversing tube and voltage control tube arrangement which have their cathode circuits connected to a common cathode bias resistor.

In the attached drawings Figure 1 shows the motor windings energized by vacuum tubes in amplifying circuits which oscillate at motor operating frequency; Figure 2 shows a control in which the motor windings are fed from tube amplifiers excited by a low frequency alternating voltage.

Referring to Fig. 1 in more detail, my invention is shown applied to an automatic frequency control system. In this figure, the apparatus shown in box 120 represents a well known frequency response network of the type illustrated in Fig. 2 of Seeley Patent 2,121,103, granted June 21, 1938, to which reference is herein made for a more complete description thereof. Apparatus 120 comprises a frequency discriminator having a transformer 28 with primary and secondary windings tuned to the same input frequency, and whose primary winding is coupled at its high potential end to the midpoint of the secondary winding. The primary winding forms part of the output tuned circuit of the intermediate frequency amplifier 90 whose input electrodes are coupled to a source of high frequency waves. The opposing terminals of the secondary windings are connected to the anodes of diode detectors 6 and 7. Coil 29 is a choke coil of high impedance to the intermediate frequency energy. The rectified energy whose polarity depends upon the sign of the frequency departure of the source of high frequency waves from the desired resonance frequency appears across the pair of like resistors which are connected between the cathodes of the diodes, and is available for utilization in lead 33.

The alternating current motor which controls the rotation of condenser 27, in turn forming part of the tuned circuit of a high frequency oscillator whose frequency of oscillations is to be controlled, includes a pair of stator windings 22 and 23 and a pair of rotors 24 and 25 linked to a common shaft. This shaft is linked to gears 26 which drive the variable condenser 27. The windings 22 and 23 form separate parts of two tuned circuits of different vacuum tube oscillator systems. One oscillator system comprises vacuum tubes 4 and 5 which are connected together in a regenerative circuit and which controls the energy fed to winding 22 of rotor 24. The other oscillator system includes vacuum tubes 1 and 3, which are connected together in a regenerative circuit, and also degenerative vacuum tube 2. The output from this last oscillator circuit controls the energy fed to winding 23 of rotor 25.

Let us consider the oscillator-amplifier system comprising tubes 4 and 5. Vacuum tube 4 is a voltage amplifier whose anode is coupled by means of condenser 9 to vacuum tube 5 which is a power amplifier. Anode voltage for tube 5 is obtained through choke coil 11, one terminal of which is connected to the positive terminal of a source of polarizing potential +B. The tuned circuit for power amplifier 5 comprises a condenser 21 which is electrically in parallel relation to the stator winding 22 of the motor 24. This condenser 21 tunes the winding 22 to the frequency of the voltage required by the motor 24. The condenser 18 is a blocking condenser which prevents the positive anode potential on tube 5 from being supplied to the tuned circuit 21, 22. Energy from the tuned output circuit of power amplifier tube 5 is fed back to the grid of the voltage amplifier 4 through blocking condenser 16, resistor 15 and resistor 17. This feed back circuit from the anode of tube 5 to the grid of tube 4 causes the amplifying system of tubes 4 and 5 to oscillate, provided the overall gain of the system is made to be sufficiently high for this purpose. This gain is controlled by varying the voltages on the elements of vacuum tube 4. If the motors 24 and 25 are designed to function at 60 cycles, it will be obvious that the oscillator systems 4 and 5 should also oscillate at 60 cycles and the other oscillator system to be described hereinafter should also oscillate at 60 cycles. The control for the vacuum tube 4 is obtained from the voltage applied to lead 33 by the apparatus 120 and serves to vary the bias of both the control grid G₁ and the second or injector grid G₂ of the tube. Battery 32 serves to furnish permanent bias to both of these grids of tube 4. Thus, when the voltage applied to lead 33 is made to be more positive than a particular reference condition, the gain of the amplifying systems 4, 5 will be increased and self-oscillations will start. The production of oscillations in the system of tubes 4 and 5 furnishes a voltage to the motor winding 22 and causes the motor 24 to rotate in one direction. A negative voltage applied by apparatus 120 to lead 33, however, will cause the production of oscillations of the system of tubes 4 and 5 to cease and thereby stop the flow of energy to the motor winding 22.

As for the oscillator-amplifying system involving tubes 1, 2 and 3, the arrangement of voltage amplifier tube 1 and power amplifier tube 3 is similar to that of tubes 4 and 5, except that it is designed to commence oscillating on a change of control voltage applied to lead 33 in the negative direction instead of in the positive direction, as is the case on tubes 4 and 5. The output tuned circuit for power tube 3 comprises condenser 29 and winding 23 of motor 25. Condenser 29 tunes the winding 23 to the frequency of the voltage required by the motor. Condenser 19 is a blocking condenser which prevents the application of the anode voltage of tube 3 to the motor winding 23. Coil 10 is a choke coil in series with the anode voltage polarizing circuit of tube 3. In addition to employing tubes 1 and 3 which function in a manner similar to tubes 4 and 5, there is provided a tube 2 which is a degeneration tube serving to vary the degree of degeneration of the oscillating-amplifying system 1, 3 instead of the degree of regeneration. The control grid (first grid) of tube 2 is excited through condenser 35 by energy from the anode circuit of tube 1 over lead 80. This energy in lead 80 obtained from the anode of tube 1 is of reverse phase to that which excites tube 1 and is applied to the control grid of tube 2. Consequently, if tube 2 amplifies with its full gain, it will place a voltage in the common anode circuit of tubes 1 and 2 of such phase that it will buck the voltage placed in this common anode circuit by tube 1. However, if the gain of tube 2 is reduced, tube 1 is allowed to amplify and self-oscillations will start. Thus, the application of a negative voltage to lead 33 applied through lead 34 to the second or injector grid of tube 2, reduces the degeneration produced by tube 2 and allows self-oscillations to exist in the oscillator system of tubes 1 and 3.

In the operation of the system of Fig. 1, it will be apparent from what has been said above that the two oscillating systems 4, 5 and 1, 2, 3 are so arranged that the oscillating system 4, 5 is turned on to produce oscillations by a positive voltage in lead 33 and that this same positive voltage serves to turn off or stop the oscillations in the other oscillating system 1, 2, 3. Similarly, the application of a negative voltage to lead 33 will cause the cessation of oscillations in the oscillating system 4, 5 and the commencement of oscillations in the oscillator system 1, 2, 3. When the oscillator system 4, 5 is producing oscillations, current will flow in the motor winding 22 to cause the motor to rotate in one direction, thus rotating condenser 27 in one particular direction. When the oscillator system 1, 2, 3 is producing oscillations, current will flow in the winding 23, and will cause the motor to rotate in a direction opposite to that referred to above, as a consequence of which, the condenser 27 will also be rotated in a reverse direction. In this way the invention provides an electronic motor control system which is controlled by the differential energy from the detectors of a frequency discriminator circuit in an automatic frequency control system.

Fig. 2 shows another and a preferred embodiment of the present invention. The system of this figure differs from that of Fig. 1 in eliminating the use of the self-oscillating amplifier system of Fig. 1, and in obtaining a reversal of the control voltage for one of the amplifiers by means of a direct current amplifier tube instead of a degeneration tube. Putting it in other words, the system of Fig. 2 functions to amplify an external low frequency alternating voltage rather than to produce in itself (as in the case of Fig. 1) the low frequency alternating voltage for operating the motor.

In Fig. 2, alternating voltage of the frequency required by the motors (for example, 110 volts, 60 cycles) is fed from external alternating current source 118 through transformer 119 and potentiometer 111, to the control grids of vacuum tube voltage amplifiers 100 and 101. The anodes or outputs of tubes 100 and 101 are resistance coupled to the control grids of vacuum tube power amplifier tubes 102 and 103, respectively. Power amplifiers 102 and 103 amplify the energy received from the voltage amplifiers to the value required by the motors 22, 24 and 23, 25. Choke coils 106 and 107 feed the anode polarizing voltage to the power amplifier tubes 102 and 103, respectively, but in Fig. 2 it should be noted that no blocking condensers are used to keep the direct current anode voltage out of the motor windings as is the case in Fig. 1, since as an alternative to the blocking condensers of Fig. 1 low enough resistance chokes can be used to assure the flow through them of practically all the direct current. The direct current control voltage from the rectifiers 6 and 7 of the frequency discriminator circuit 120 is fed through time constant circuit 112 and 121 to the control grid of a direct current amplifier vacuum tube 109 which serves to reverse the polarity of the control voltage fed to amplifier tube 100. This reversal of polarity is accomplished by directly connecting together the cathodes of tubes 109 and 100 and employing a common cathode bias resistor 104, as a result of which the increase of voltage in the positive direction on the grid of vacuum tube 109 causes more anode current to flow in vacuum tube 109, and therefore increases the positive bias on the cathode of tube 100. Thus, a positive voltage on the grid of tube 109 is the same as a negative voltage on the control grid of tube 100. This allows the control voltages of both amplifier systems to be fed from the same point as is preferable in the case of automatic frequency control (AFC) systems. Diodes 6 and 7 are the differential diodes of an AFC system. Time constant circuit 112 and 121 allows only slow variations of applied direct current voltages to control the motor.

In the operation of Fig. 2, either voltage amplifier 100 or 101 permits the alternating current voltage from external source 115 to pass through the tube to control the rotation of the motor in the particular direction required, depending upon which tube happens to have applied to its second or injector grid a positive direct current voltage from the discriminator circuit. Thus, when a positive direct current voltage appears on lead 33, vacuum tube 101 will permit 60 cycle alternating voltage to pass therethrough to be amplified by power amplifier 103 to energize the tuned circuit 21, 22 and thus cause the motor to rotate in a particular direction for varying the rotation of the condenser element 27 in the oscillator. The application of this positive voltage on lead 33 will produce a negative voltage on the second or injector grid of vacuum tube voltage amplifier 100 which will prevent this last tube from passing current. On the other hand, a negative voltage on lead 33 will bias the vacuum tube 101 to cut-off, and will produce a positive voltage on the injector grid of vacuum tube 100, by virtue of the polarity reversal tube 109, thus permitting 60 cycle alternating voltage from source 115 to pass through tubes 100 and 102 for exciting the tuned circuit 20, 23, enabling the motor to rotate in an opposite direction to the previous condition.

In one embodiment of the system of Fig. 2 tried out in practice, the voltage amplifier tubes 100 and 101 were RCA 6L7 mixer tubes. These tubes have the advantage that the controlling voltage may be applied to the injector grid (second grid as shown in the drawings). Hence, if a rather high positive control voltage from lead 33 happens to be applied, the gain of the voltage amplifier tube is not reduced as would be the case if a high positive voltage were applied to the control grid so that grid current would be drawn. This self limiting feature was also employed in the case of the direct current amplifier reversing tube 109 which in the experimental embodiment tried out in practice was an RCA 6F6 tube connected as a triode. The use of this self-limiting feature it has been found overcomes the possibility of causing one of the amplifiers to lock and thus produce a continuous output in the event of the application of a surge of control voltage. By using an anode supply of 250 volts for the power amplifiers 102 and 103, it was found that with three RMS volts fed to the amplifiers it took about 90 volts at the motor terminals to start rotation. This 90 volts is fed to one motor winding when the control voltage changes a positive 5 volts and to the other motor winding when the control motor winding changes a negative 5 volts. Higher values of control voltage, it was found, could increase the voltage at motor terminals to a value of 120 volts in the particular experimental embodiment tried out in practice.

Although the invention has been described with particular reference to a frequency discriminator circuit for obtaining unidirectional control voltages therefrom, it should be understood that the invention has wider application and may be used for the remote control of a receiver or for transmitter tuning purposes. In these last cases, the control voltage can be applied from a pair of push buttons, one of which applies a positive voltage and the other a negative voltage.

What is claimed is:

1. An electronic system comprising alternating current motor driving means having a pair of stator windings for affecting a common drive shaft to rotate in opposite directions, depending upon which stator winding is excited at the frequency of said motor driving means, a pair of amplifier tubes having similar tuned circuits, said tuned circuits being tuned to the operating frequency of said motor driving means and having different ones of said stator windings associated therewith for exciting the same, a source of alternating current voltage of the frequency of said motor driving means, a pair of electric discharge devices coupling said source to the inputs of said amplifier tubes, a frequency response circuit for applying unidirectional voltages to said electric discharge devices, and means for reversing the polarity of the unidirectional voltages applied to one of said devices, whereby only one of said devices at a time is conductive.

2. An electronic motor control system comprising alternating current motor driving means having a pair of stator windings for affecting a common drive shaft to rotate in opposite directions depending upon which stator winding is excited at the frequency of said motor driving means, a pair of power amplifier tubes having similar tuned circuits, said tuned circuits having different ones of said stator windings associated therewith for exciting said stators, a source of alternating current voltage of the frequency of said motor driving means, a voltage amplifier coupling the input circuit of each of said power amplifiers to said source, a frequency response circuit for producing direct current voltages whose polarity depends upon the direction of frequency departure of a source of high frequency waves impressed upon said frequency response circuit, individual circuits coupling the output of said frequency response circuit to the input electrodes of said voltage amplifiers, and a polarity reversing system in one of said individual circuits, whereby voltages of opposite polarities simultaneously appear upon the input electrodes of said voltage amplifiers, as a consequence of which said voltage amplifiers are alternately conductive.

3. An electronic motor control system comprising alternating current motor driving means having a pair of stator windings for affecting a common drive shaft to rotate in opposite directions depending upon which stator winding is excited at the frequency of said motor driving means, a pair of oscillator circuits adapted to oscillate at the frequency of said motor driving means, each oscillator circuit including a pair of vacuum tubes regeneratively coupled together, a tuned circuit for a vacuum tube in each of said oscillator circuits, said tuned circuits having different ones of said stator windings associated therewith for exciting said stators, a degenerative vacuum tube circuit coupled to one of said oscillator circuits, whereby the application of a positive control potential to the input of said degenerative tube circuit will cause the oscillator circuit coupled thereto to cease oscillating, and the application of said same positive control potential to the other oscillator circuit will cause it to commence oscillating, and vice versa for the application of a negative control potential, a frequency response circuit for producing direct current voltages whose polarity depends upon the direction of frequency departure of a source of high frequency waves impressed upon said frequency response circuit, and connections from a common point on said frequency response circuit to the degenerative tube circuit and also to said last oscillator circuit.

4. A motor control system comprising alternating current motor driving means having a pair of stator windings and a common drive shaft therefor, said windings being adapted to cause said shaft to rotate in opposite directions, an electron discharge device amplifier for each stator winding, means for exciting said stator windings at the operating frequency of said motor solely through said electron discharge device amplifiers, said amplifiers having output circuits turned to the operating frequency of said motor and each of which has one stator winding constituting the main inductance thereof, and means for applying direct current control voltages to the input circuits of said electron discharge devices, the polarities of said voltages depending upon the direction in which it is desired to rotate said driving means.

5. A motor control system in accordance with claim 4, including an oscillator having a rotary frequency determining element, and means for driving said rotary element from said drive shaft.

6. In combination, an oscillator system comprising first and second vacuum tube amplifiers, a circuit coupling the output of said first tube to the input of the second tube, and a circuit coupling the output of the second tube to the input of the first tube to thereby form a regenerative circuit, and a degeneration tube having its output electrode coupled in parallel relation to the output electrode of one of said amplifier tubes, a connection from the output electrode of said degeneration tube to its input electrode, and means for controlling the gain of said degeneration tube in accordance with the polarity of a direct current voltage applied thereto.

7. In combination, an oscillator system comprising first and second vacuum tube amplifiers, a circuit coupling the output of said first tube to the input of said second tube, and a circuit coupling the output of said second tube to the input of the first tube, to thereby form a regenerative circuit, and a multi-grid degeneration tube having its output electrode directly connected to the output electrode of one of said amplifier tubes, a capacitive connection between the output electrode and the first grid of said degeneration tube, a resistor connected between the first grid and injector grid of said degeneration tube, and means for applying a control potential to said injector grid to vary the gain of said degeneration tube to thereby control the production of oscillations by said regenerative circuit.

8. In combination, an electron discharge device having a cathode, first and second grids and an anode, a resistor shunted by a condenser connected between said cathode and a point of fixed alternating current potential, a connection from a tap on said resistor to said second grid, an alternating current utilization circuit coupled to said anode, another electron discharge device having a grid and a cathode, a direct connection between the cathodes of said two dev'ces, and means for applying a direct current control potential to the grid of said other device to thereby reverse the effective polarity of the control potential on the first grid of said first device.

9. In combination, an oscillator system comprising first and second vacuum tube amplifiers, a circuit coupling the output of said first tube to the input of the second tube, and a circuit coupling the output of the second tube to the input of the first tube to thereby form a regenerative circuit, and a degeneration tube having its output electrode coupled in parallel relation to the output electrode of said first amplifier tube, a connection from the output electrode of said degeneration tube to its input electrode, a tuned circuit coupled to the output electrode of said second tube, said tuned circuit including one winding of an alternating current motor, and means for controlling the gain of said degeneration tube in accordance with the polarity of a direct current voltage applied thereto to thereby control rotation of said motor.

10. In combination, an oscillator system comprising first and second vacuum tube amplifiers, a circuit coupling the output of said first tube to the input of said second tube, and a circuit coupling the output of said second tube to the input of the first tube, to thereby form a regenerative circuit, and a multi-grid degeneration tube having its output electrode directly connected to the output electrode of said first amplifier tube, a capacitive connection between the output electrode and the first grid of said degeneration tube, a resistor connected between the first grid and injector grid of said degeneration tube, an alternating current motor having a stator winding and a condenser in shunt to said winding, said winding and condenser forming a circuit tuned to the operating frequency of said motor, a connection from the output of said second tube to said tuned circuit, and means for applying a control potential to said injector grid to vary the gain of said degeneration tube to thereby control the production of oscillations by said regenerative circuit and also control rotation of said motor.

11. In combination, an electron discharge device having a cathode, control and injector grids and an anode, a resistor shunted by a condenser connected between said cathode and a point of fixed alternating current potential, a connection from a point on said resistor to said injector grid, an alternating current motor having a control circuit coupled to said anode, another electron discharge device having a grid and a cathode, a direct connection between the cathodes of said two devices, and means for applying a direct current control potential to the grid of said other device to thereby reverse the effective polarity of the control potential on the first grid of said first device and thereby control rotation of said motor.

12. A motor control system comprising, in combination, an electron discharge device having an output tuned circuit connected to a pair of electrodes of said discharge device through connections devoid of concentrated inductance, said output tuned circuit consisting of an inductance coil in parallel relation to a condenser, said coil constituting the stator winding of an alternating current motor, said tuned circuit being tuned to the frequency to which said motor is responsive.

13. A motor control system comprising motor driving means having a pair of stator windings and a common drive shaft therefor, said windings being adapted to cause said shaft to rotate in opposite directions, an electron discharge device amplifier for each stator winding, means for exciting said stator windings at the operating frequency of said motor solely through said electron discharge device amplifiers, said amplifiers having tuned output circuits coupled thereto through connections devoid of concentrated inductance, each of said tuned output circuits being tuned to the operating frequency of the motor and having one stator winding constituting the main inductance thereof.

14. A motor control system comprising an alternating current motor driving means having a pair of stator windings and a pair of rotors, a common drive shaft between said rotors, an electron discharge device having a parallel tuned output circuit coupled to a pair of electrodes of said device through connections devoid of concentrated inductance, said output circuit being tuned to the operating frequency of said motor, said output circuit including one of said stator windings as the inductance coil thereof, another electron discharge device also having a parallel tuned output circuit coupled to a pair of electrodes of said device through connections devoid of concentrated inductance, said last output circuit being tuned to the operating frequency of said motor, said last output circuit including the other stator winding as the inductance coil thereof, whereby said stators are excited by the oscillatory energy present solely in their respective tuned circuits to cause said driving means to rotate said drive shaft in either of two directions, and means for alternately exciting said discharge devices.

15. A motor control system comprising alternating current motor driving means having a pair of stator windings and a common drive shaft therefor, said windings being adapted to cause said shaft to rotate in opposite directions, an electron discharge device amplifier for each stator winding, means for exciting said stator windings at the operating frequency of said motor solely through said electron discharge device amplifiers, said amplifiers having parallel tuned output circuits which are tuned to the operating frequency of said motor, each of said parallel tuned output circuits having one stator winding constituting the main inductance thereof, and means for applying direct current control voltages to the input circuits of said electron discharge devices, the polarities of said voltages depending upon the direction in which it is desired to rotate said driving means.

MURRAY G. CROSBY.